US011838379B2

(12) United States Patent
Shetty et al.

(10) Patent No.: US 11,838,379 B2
(45) Date of Patent: Dec. 5, 2023

(54) TAILORING NOTIFICATION POSTING BASED ON DEVICE ACTIVITY STATUS

(71) Applicant: VMWARE, INC., Palo Alto, CA (US)

(72) Inventors: Rohit Pradeep Shetty, Bangalore (IN); Ramanandan Nambannor Kunnath, Bangalore (IN)

(73) Assignee: VMWare, Inc., Palo Alto, CA (US)

(*) Notice: Subject to any disclaimer, the term of this patent is extended or adjusted under 35 U.S.C. 154(b) by 0 days.

(21) Appl. No.: 17/498,785

(22) Filed: Oct. 12, 2021

(65) Prior Publication Data

US 2023/0024748 A1 Jan. 26, 2023

(30) Foreign Application Priority Data

Jul. 24, 2021 (IN) .............................. 202141033331

(51) Int. Cl.
*H04L 67/55* (2022.01)
*H04L 67/104* (2022.01)
*H04L 67/50* (2022.01)
*H04M 1/72484* (2021.01)
*H04M 1/72463* (2021.01)

(52) U.S. Cl.
CPC ............ *H04L 67/55* (2022.05); *H04L 67/104* (2013.01); *H04L 67/535* (2022.05); *H04M 1/72463* (2021.01); *H04M 1/72484* (2021.01)

(58) Field of Classification Search
CPC ..... H04L 67/55; H04L 67/535; H04L 67/104; H04M 1/72463; H04M 1/72484

USPC ........................................................ 709/203
See application file for complete search history.

(56) References Cited

U.S. PATENT DOCUMENTS

| | | | | |
|---|---|---|---|---|
| 2003/0046189 A1* | 3/2003 | Asayama | ............... | G06F 21/629 705/14.61 |
| 2011/0003586 A1* | 1/2011 | Harrigan | ................. | H04W 4/90 455/419 |
| 2015/0212674 A1* | 7/2015 | Firstenberg | ............. | H04L 67/75 715/747 |
| 2015/0341290 A1* | 11/2015 | Cherifi | .................... | H04W 4/12 709/206 |
| 2020/0259948 A1* | 8/2020 | Keohane | ................. | H04L 67/52 |

OTHER PUBLICATIONS

J. Rubin, M. I. Gordon, N. Nguyen and M. Rinard, "Covert Communication in Mobile Applications (T)," 2015 30th IEEE/ACM International Conference on Automated Software Engineering (ASE), Lincoln, NE, USA, 2015, pp. 647-657 (Year: 2015).*

(Continued)

*Primary Examiner* — Taylor A Elfervig
(74) *Attorney, Agent, or Firm* — Thomas | Horstemeyer, LLP

(57) ABSTRACT

Disclosed herein are examples of systems and methods for tailoring the posting of notifications based on device activity status. A client device can collect activity data associated with the client device. The client device can provide the activity data to a management service. The client device can receive from the management service a command to disable a capability of an application installed on the client device to post notifications. The client device can cause the capability of the application to post notifications to be disabled.

15 Claims, 4 Drawing Sheets

(56) References Cited

OTHER PUBLICATIONS

E. B. Nuakoh and I. Coffie, "MonitR®: A Mobile Application for Monitoring Online Accounts' Security," SoutheastCon 2018, St. Petersburg, FL, USA, 2018, pp. 1-9, (Year: 2018).*

O. I. Artyukhov, I. M. Krepkov and S. V. Gorodnichev, "Subsystem for Remote Monitoring of Network Elements," 2018 IV International Conference on Information Technologies in Engineering Education (Inforino), Moscow, Russia, 2018, pp. 1-4 (Year: 2018).*

Y. Alghamdi and P. Seeling, "Activity-based cloud sending: Push services for user device multiplicity," 2015 12th Annual IEEE Consumer Communications and Networking Conference (CCNC), Las Vegas, NV, USA, 2015, pp. 556-561, (Year: 2015).*

\* cited by examiner

TAILORING NOTIFICATION POSTING BASED ON DEVICE ACTIVITY STATUS

RELATED APPLICATIONS

Benefit is claimed under 35 U.S.C. 119(a)-(d) to Foreign Application Serial No. 202141033331 filed in India entitled "TAILORING NOTIFICATION POSTING BASED ON DEVICE ACTIVITY STATUS", on Jul. 24, 2021, by VMware, Inc., which is herein incorporated in its entirety by reference for all purposes.

The present application is related in subject matter to U.S. patent application Ser. No. 17/498,795, which is incorporated herein by reference.

Users often have multiple different devices enrolled with an enterprise. In the bring-your-own-device word where the enterprise's backend is accessible from client application, employees often have their enterprise accounts synced on several devices for easy accessibility. This increases user productivity and provides convenience.

However, the bring-your-own-device paradigm creates multiple problems. For example, users may receive notifications for enterprise applications on all their devices. This excess of notifications can cause clutter in the notification display area on each device, which can lead to missed notifications. In addition, confidential data may be inadvertently leaked via notifications on an unused device lying on a user's, a device left in a user's hotel room, or a device that has been misplaced. Even if that device is locked, notifications that contain confidential information may still display on the device's lock screen.

In addition, when a notification is acted upon by a user on one device, the state of the acted-upon notification is not reciprocated for corresponding notifications on the user's other devices. Yet there may no longer be a need for these corresponding notifications to be displayed on the user's other devices. Such "stale" notifications can create several problems for users. For example, "stale" notifications can create unnecessary clutter in the notification display areas on those other devices. As another example, a user may be required to perform a duplicate action or otherwise act upon a "stale" notification, even after the user has already acted upon a corresponding notification on another device. As an additional example, if a user dismisses a notification that contains confidential information for security reasons, corresponding notifications containing that confidential information may still be visible on that user's other devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to tailoring the posting of notifications to a device based on the device's activity status. Previously, active devices were simply considered to be devices that were powered on and connected to the internet. Because of this high-level definition, unused devices would receive notifications. A user might have many devices powered on and connected to the internet, but that is likely using only one or two of those devices at a time. The criteria for what is and is not an active device can be redefined. Instead, those devices that are actively being used by a user as active devices, for example, can be considered active devices. The ability of applications to post notifications can be enabled or disabled based on a device's activity status. Thus, a user may not receive notifications on devices that the user is not actively using.

The present disclosure also relates to synchronizing actions performed with respect to notifications among multiple devices owned by a user. If a notification is acted upon one device, the state of that notification can be synchronized across other devices. In some examples, though, whether the state of an acted-upon notification is synchronized across other devices can depend on a type of the acted-upon notification. For instance, if a type of notification should be addressed individually on each device to which the notification is delivered, the dismissal of that notification may not be synchronized across other devices.

Figure 1:
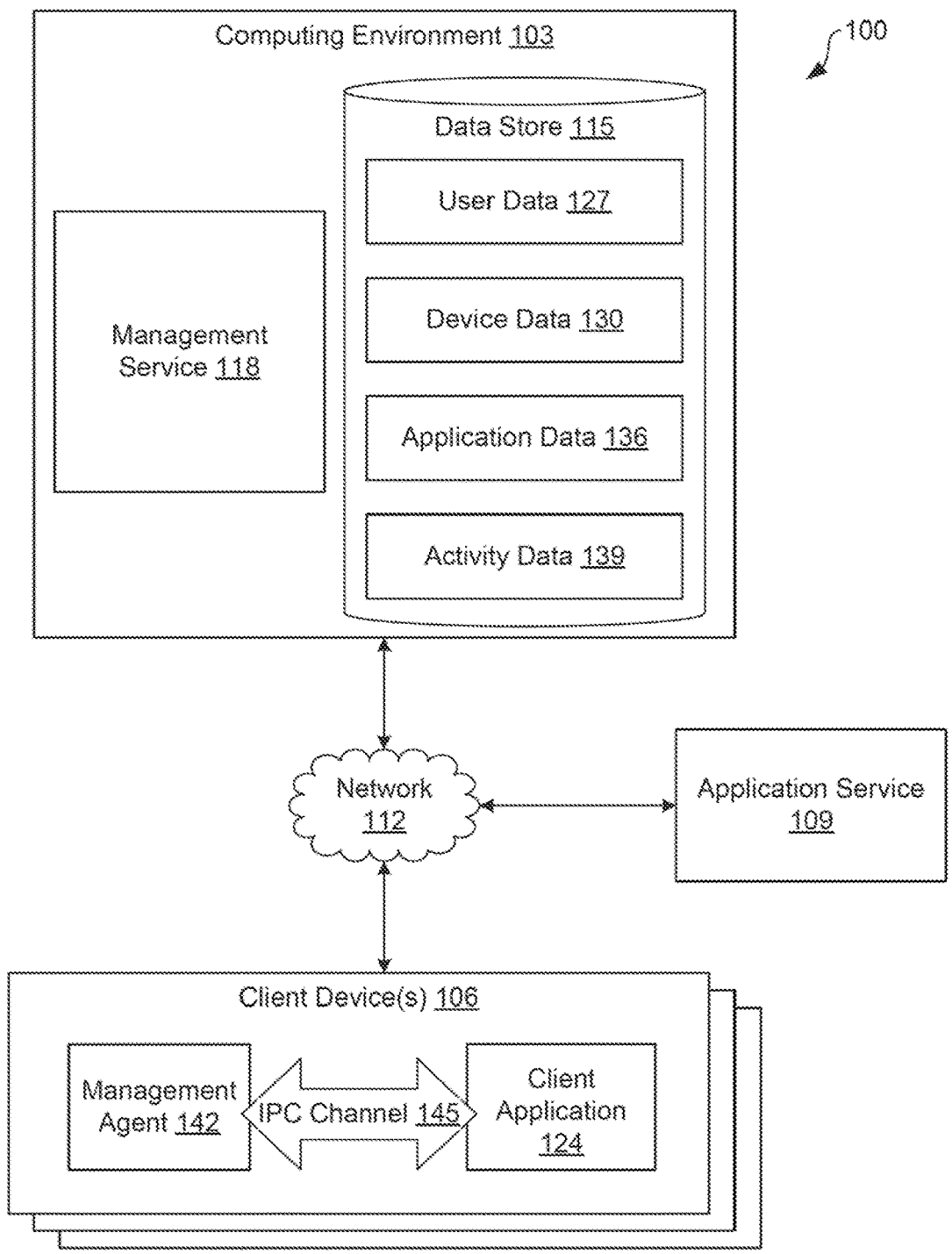
FIG. 1 shows an example of a networked environment, according to various embodiments of the present disclosure.

FIG. 1 shows an example of a networked environment 100. The networked environment 100 can include a computing environment 103, client device(s) 106, and an application service 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 can include wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can be embodied as one or more computers, computing devices, or computing systems. In certain embodiments, the computing environment 103 can include one or more computing devices arranged, for example, in one or more servers or computer banks. The computing device or devices can be located at a single installation site or distributed among different geographical locations. The computing environment 103 can include a plurality of computing devices that together embody a hosted computing resource, a grid computing resource, or other distributed computing arrangement. In some cases, the computing environment 103 can be embodied as an elastic computing resource where an allotted capacity of processing, network, storage, or other computing-related resources vary over time. As further described below, the computing environment 103 can also be embodied, in part, as certain functional or logical (e.g., computer-readable instruction) elements or modules as described herein.

The computing environment 103 can operate as an environment for mobile device management or a Unified Endpoint Management (UEM) platform that can manage the client devices 106. In that context, the computing environment 103 can include a data store 115. The computing environment can also execute a management service 118, an identity provider, and potentially other application(s).

The management service 118 can operate as a UEM platform that can manage the client devices 106 that are enrolled with the management service 118 for management. In some examples, the management service 118 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various application programming interfaces and services that allow client devices 106 to be enrolled as managed devices with the management service 118. The management service 118 can initiate installation of applications as managed applications. The management service 118 121 can also initiate installation of configuration profiles that can be accessed by certain applications installed on a client device 106.

The management service 118 can include a management console that can allow administrators to manage client devices 106 that are enrolled with the management service 118. User interfaces can allow an administrator to define policies for a user account or client devices 106 associated with an enterprise environment. The user interfaces can also include, for example, presentations of statistics or other information regarding the client devices 106 that can be managed by the management service 118.

The management service 118 can determine an activity status of the client device 106 based on the activity data 139. The management service can receive activity data 139 from various client devices 106. In some examples, the management service 118 can receive the activity data 139 from a management agent 142 executing on a client device 106.

In some examples, the management service 118 can determine the activity status of the client device 106 based on activity data 139 from one or more predefined time periods. For example, the management service 118 can use activity data 139 from a previous 24 hours or other length of time before the management service 118 received the activity data 139, from one or more particular times of day, from one or more particular days of the week or days of the month, or any periods of time.

The management service 118 can then determine the activity status based on whether the activity data 139 indicates that the client device 106 has been used within the predefined time period. For example, if the activity data 139 indicates that the client device 106 has not been used within the predefined time period, the management service 118 can determine that the activity status for the client device 106 is active. As another example, if the activity data 139 indicates that a user has been used during the predefined time period, the management service 118 can determine that the activity status for the client device 106 is active.

If the client device's 106 activity status is inactive, the management service can provide to the application service 109 an indication of that activity status. The management service 118 can access the application data 136 to identify client application 124 installed on the client device 106 and determine the application service 109 associated with the client application 124. In some examples, the management service 118 may provide the indication that the client device 106 is inactive to multiple different application services 109 associated with multiple different client applications 124 installed on the client device 106. In some examples, the management service 118 can transmit the client device's 106 activity status to the application service 109. In other examples, the management service 118 can expose the client device's 106 activity status to the application service 109 using an application programming interface (API). For instance, the application service 109 can call an API provided by the management service 118 to obtain the client device's 106 activity status.

The management service 118 can determine whether to enable or disable a capability of a client application 124 installed on the client device 106 to post notifications. In some examples, the management service 118 can determine whether to enable or disable the capability of the client application 124 to post notifications based on the activity status of the client device 106, as well as other data from the activity data 139 and the application data 136. For example, if the management service 118 determines that the client device 106 is inactive, the management service 118 can determine to disable the capability of the client application 124 to post notifications, unless the capability of the client application 124 to post notifications is already disabled. As another example, if the management service 118 determines that the client device 106 is active, the management service 118 can determine to enable the capability of the client application 124 to post notifications, unless the capability of the client application 124 to post notifications is already enabled. If, however, the activity status of the client device 106 has not changed since a previous determination of the activity status, the management service 118 may determine to refrain from enabling or disabling the capability of the client application 124 to post notifications.

In some examples, even if a client device 106 is determined to be inactive, the capability of a client application 124 installed on that client device 106 may or may not be disabled based one or more factors using information from the application data 136. For example, the management service 118 can cause the capability of the client application 124 to post notifications if the client application 124 is a client application 124. As another example, the capability of the client application 124 to post notifications may be disabled if the client application 124 involves a high degree of confidentiality. On the other hand, capability of the client application 124 to post notifications may not be disabled if the client application 124 involves a low degree of confidentiality. As a third example, the capability of the client application 124 to post notifications can be disabled when the client device 106 is located outside or inside a particular area. As a fourth example, the capability of the client application 124 to post notifications can be disabled if the client application 124 has a lower priority. On the other hand, the capability of the client application 124 to post notifications may not be disabled the client application 124 has a higher priority.

The management service 118 can provide to the client device 106 a command to enable or disable a capability of the client application 124 to post notifications. The management service 118 can provide the command to the management agent 142. For example, the management service 118 can place a command in a command queue maintained for an affected client device 106 for retrieval by the management agent 142. As another example, the management service 118 can provide the command directly to the management agent 142. In other examples, however, the management service 118 can provide the command directly to the client application 124.

In some examples, the management service 118 the command can instruct the management agent 142 to enable or disable data synchronization for the client application 124, instead of or in addition to enabling or disabling the capability of the client application 124 to post notifications. The management service 118 can determine to command the management agent 142 to disable data synchronization for the client application 124 based the activity data 139. For example, the management service 118 can determine that data synchronization should be disabled in response to detecting an anomalous usage of the client device 106 from the activity data 139. An anomalous usage of the client device 106 can include a use of the client device 106 that departs substantially from the usage patterns and other usage data for the client device 106 from the activity data 139.

The management service 118 can receive metadata associated with a notification from the management agent 142. The metadata can include, for example, a notification identifier, a notification type, notification content, one or more actions associated with a notification, and other data associated with a notification.

The management service 118 can receive indication of an action performed with respect to the notification from the management agent 142. In some examples, the management service 118 can provide the indication of the action performed with respect to the notification to the application service 109.

When an action has been performed with respect to a notification on a first client device 106, the management service 118 can determine whether to propagate a new notification state to at least one second client device 106 associated with a same user account. Propagating this new notification state to the second client device 106 can cause a client application 124 installed on the second client device 106 to change a state of a notification on the second client device 106 to the new notification state. The notification on the second client device 106 can correspond to the acted-upon notification on the first client device 106. For example, a delete action, an archive action, or a reply action is performed with respect to an email notification on a first client device 106, a corresponding email notification on a second client device 106 may no longer need to be displayed. In that example, the management service 118 can determine that a new notification state involving in a dismissal of the corresponding email notification can be propagated to the second client device 106.

The management service 118 can determine whether to propagate the new notification state to the second client device 106 based on one or more factors, alone or in combination. As one example, the management service 118 can determine whether to propagate the new notification state based on, a type of the notification on the first client device 106, the notification on the second client device 106, or both. The type of the notification could indicate that the notification is intended to be addressed individually on each client device 106 to which it is delivered. For example, a software update notification may be posted to a first client device 106 and a second client device 106. When a user interacts with the notification on the first client device 106 to cause an installation of the software update, the management service 118 may not propagate a new notification state to the second client device 106 because the software updated is intended to be addressed individually on each client device 106.

As another example, the management service 118 can make this determination based on a current notification state of the notification on the second client device 106. For instance, the management service 118 may determine not to propagate the new notification if the current notification state of the notification on the second client device 106 is the same as the new notification state. Likewise, the management service 118 may determine to propagate the new notification if the current notification state of the notification on the second client device 106 is different from the new notification state.

As an additional example, the management service 118 can make this determination based on an activity status of the second client device 106. For instance, the management service 118 may determine not to propagate the new notification state if the activity status of the second client device 106 is inactive. Likewise, the management service 118 may determine to propagate the new notification state if the activity status of the second client device 106 is active.

The management service can provide to a client device 106 a command to change a state of the notification on the second client device 106 from the current notification state to the new notification state. For example, the management service 118 can place a command in a command queue maintained for the second client device 106.

The data store 115 can comprise a database or other data store 115 system that can be utilized by the computing environment 103. The data store 115 can be representative of a plurality of data store 115s. The data store 115d in the data store 115 can be associated with the operation of various applications or functional entities of the client device 106. The data store 115 can include user data 127, device data 130, application data 136, and activity data 139, among other types of data.

The user data 127 can represent information about users who have user accounts with the management service 118 or an enterprise that uses the management service 118. These users can also have one or more client devices 106 that are enrolled as managed devices with the management service 118. User data 127 can include authentication data and information about network services with which the user is assigned an account.

The device data 130 can represent information about client devices 106 that are enrolled as managed devices with the management service 118. The device data 130 can include device identifiers associated with client devices 106, certificates associated with client devices 106, user identifiers identifying user accounts with which the client devices 106 are linked, authentication tokens provided by an identity provider to the client devices 106, configuration profiles assigned to the client devices 106, and other information regarding management of the client devices 106 as enrolled devices.

The application data 136 can represent information about client application 124 installed on the client devices 106. For example, the application data 136 can comprise data representing whether a particular client application's 124 capability to post notifications is enabled or disabled. As another example, the application data 136 can comprise data indicating an application service 109 associated with a particular client application 124. In some examples, the application data 136 can also include information regarding a degree of confidentiality involved in the client application 124, a priority of the client application 124, a sensitivity of the application to a location of the client device 106, or whether the client application 124 is associated with an enterprise.

The activity data 139 can represent usage, settings, statuses, and other information indicative of activity on a client device 106. For example, the activity data 139 can comprise data representing one or more interactions with the client device 106, the usage of one or more applications installed on the client device 106, a lock status, a power status, a network connectivity status, accelerometer data, usage patterns, or other data related to the usage of the client device 106. The management service 118 can determine a current or previous activity status of a client device 106 based on the activity data 139.

The client devices 106 can represent one or more client devices 106. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending on its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include displays, indicator lights, speakers, global positioning system (GPS) circuitry, accelerometers, gyroscopes, or other peripheral devices depending upon the primary purpose or function of the client devices 106.

An example client device 106 can be enrolled by the management service 118 for device management. A management agent 142 can be installed on a client device 106 to facilitate management of client application 124 also installed on the client device 106. The management agent 142 can be installed with elevated privileges or be effectuated through operating system APIs to manage the client device 106 on behalf of the management service 118. The management agent 142 can have the authority to manage data on the client device 106; install, remove, or disable certain applications; or install configuration profiles, such as VPN certificates, Wi-Fi profiles, email profiles, or other profiles for configuring various functions or applications of the client device 106.

The management agent 142 and the client application 124 can communicate using an interprocess communication channel 145. The interprocess communication channel 145 can be, for example, a peer-to-peer channel or any other channel providing communication between the management agent 142 and the client application 124.

The management agent 142 can collect activity data 139 from the client device 106. The activity data 139 can represent usage, settings, statuses, and other information indicative of activity on a client device 106. For example, the activity data 139 can comprise data representing one or more interactions with the client device 106, the usage of one or more applications installed on the client device 106, a lock status, a power status, a network connectivity status, accelerometer data, usage patterns, or other data related to the usage of the client device 106.

In some examples, management agent 142 can collect activity data 139 from within a predefined time period. For example, the management agent 142 can collect activity data 139 from a previous 24 hours or other previous length of time, from one or more particular times of day, from one or more particular days of the week or days of the month, or any from periods of time.

The management agent 142 can provide activity data 139 to the management service 118. In some examples, the management agent 142 can provide the activity data 139 to the management service 118 periodically, in response to an event, or at any other suitable time. For example, if a user resumes using a client device 106 that was previously inactive, the management agent 142 can provide activity data 139 to the management service 118. As another example, if a user ceases using a client device 106 that was previously active, the management agent 142 can provide activity data 139 to the management service 118.

The management agent 142 can receive from the management service 118 a command to enable or disable a capability of the client application 124 to post notifications on the client device 106. The management agent 142 can receive the command directly from the management service 118, or the management agent 142 can retrieve that command from a command queue maintained by the management service 118.

The management agent 142 can cause the capability of the client application to post notification to be disabled. In some examples, the management agent 142 can provide a command to enable or disable posting notifications to the client application 124 through the interprocess communication channel 145. In other examples, the management agent 142 can disable an operating system permission for the client application 124 to post notifications.

In some examples, command can specify for which applications the capability to post notification is to be enabled or disabled. The management agent 142 can then provide the command to the client application 124 if the command specifies the client application 124 as an application for which the capability to post notification is to be enabled or disabled. In some examples, the command can instruct the management agent 142 to enable or disable data synchronization for the client application 124, instead of or in addition to enabling or disabling the capability of the client application 124 to post notifications.

The management agent 142 can receive from the client application 124 an indication that a notification has been posted on the client device 106. In some examples, the management agent 142 can also receive metadata associated with that notification. The management agent 142 can provide the metadata associated with the notification to the management service 118. The metadata can include, for example, a notification identifier, a notification type, notification content, one or more actions associated with a notification, and other data associated with a notification.

The management agent 142 can receive from the client application 124 an indication that an action has been performed with respect to the notification. The management agent 142 can provide the indication of the action performed with respect to the notification to the management service 118.

The client application 124 can represent various types of applications executable by the client device 106. For example, the client application 124 could be a web browser, a productivity application, a messaging application, or other application. The client application 124 can be associated with an enterprise or with a third-party entity.

The client application 124 can receive notifications from the application service 109. A notification can include a message or other indication to be displayed in a user interface of the client device 106. A notification can be, for example, a heads-up notification, a lock screen notification, a notification bar notification, an application badge notification, or a toast notification. Notifications can be received from the application service 109 through the network.

The client application 124 can post notifications received from the application service 109 on the client device 106 if a capability of the client application 124 to post notification is enabled. The client application 124 can post notifications to the client device 106 by, for example, invoking functionality provided by an operating system of the client device 106. Posting a notification can include pushing the notification or otherwise causing the notification to be displayed in a notification display area or elsewhere in a user interface of the client device 106.

The client application can receive a command to enable or disable its capability to post notifications from the management agent 142 via the interprocess communication channel 145. When the client application 124 receives a command to disable its ability to post notifications, the client application 124 can then refrain from posting notifications. The client application 124 can continue to refrain from posting notifications until a command to enable its capability to post notifications is received from the management agent 142. In some examples, however, the client application 124 can receive a command to enable or disable posting notifications from the management service 118.

The client application 124 can enable or disable its capability to post notifications. For example, the client application 124 can enable or disable a setting of the client application 124 that controls whether the client application 124 can post notifications. As another example, the client application 124 can modify an operating system permission to enable or disable its capability to post notifications. If a command received from the management agent 142 or management service 118 instructs the client application 124 to enable disable its capability to post notifications, the client device 106 can then refrain from posting any notification received from the application service 109 or other source. The client application 124 can continue to refrain from posting notifications until the client device 106 receives a command to enable its capability to post notifications. If the command instructs the client application 124 to enable its capability to post notifications, the client device 106 can then resume posting notifications received from the application service 109 or other source. The client application 124 can continue to post notifications until the client device 106 receives a command to enable its capability to post notifications.

The client application 124 can provide the management agent 142 with an indication that a notification has been posted on the client device 106. In some examples, the client application 124 can also provide metadata associated with that notification to the management agent 142. The metadata can include, for example, a notification identifier, a notification type, notification content, one or more actions associated with a notification, and other data associated with a notification.

The client application 124 can receive a user interaction with the notification on the client device 106. The user interaction can correspond to an action performed with respect to the notification, and the client application 124 can provide the management agent 142 with an indication that the action has been performed with respect to the notification. A notification can include one or more actions performable with respect to a notification. An action performable with respect to a notification can include, for example, a dismissal of the notification, a reply to a message delivered to the client application 124, a deletion of data associated with the client application 124, or any other action that effectuates functionality provided by the client application 124.

The client application 124 can receive from the management service 118 a command to change a state of a notification posted on the client device 106 to a new notification state. The new notification state can be specified by the command. The state of a notification can relate to how the notification is displayed on the client device 106, including, for instance, a displayed state, a dismissed state, an expanded state, a collapsed state, a snoozed state, or an updated state. For example, a notification can be in a displayed state when the notification is displayed in a user interface of the client device 106 and a dismissed state when a dismissal action is performed with respect to the notification, in which case the notification is no longer displayed. As a second example, a notification can be in an expanded state when all of the content associated with the notification is displayed and a collapsed state when only a portion of that content is displayed. As a third example, a notification can be in a snoozed state when a snooze action is performed with respect to the notification, in which case the notification can be hidden for a period of time. As a fourth example, a notification can be in an updated state when an action performed with respect to the notification causes the content associated with the notification to change.

The client application 124 can then change the state of the notification from a current notification state to the new notification state. In some examples, the client device 106 can change the state of the notification from the current notification state by causing an action to be performed that results in the notification taking on the new notification state. For example, the client application 124 can cause a dismissal action to be performed with respect to a notification currently displayed on the client device 106, in which case the notification will no longer be displayed on the client device 106.

In some examples, notifications received by the client device 106 can include a notification payload. When a client device 106 receives a notification that includes a notification payload, the client application 124 can check the notification payload of the notification to determine whether the client device 106 should post the notification. The notification payload can comprise, for example, a notification identifier, a notification type, notification content, and a list of device identifiers for devices that should post the notification. In some examples, the client application 124 can check the list of device identifiers included in the notification payload. For instance, if the device does not find its own device identifier on the list of device identifiers, the device can refrain from posting the notification. In some examples, however, the list of device identifiers can identify devices that should not post notifications. In that case, the device can refrain from posting the notification if it does find its own device identifier on the list of device identifiers.

The application service 109 can be a cloud-based service that provides various services to client application 124 such as storing data generated or used by the client application 124, providing notifications or other content to the client application 124, or otherwise supporting operations of the client application 124. The application service 109 can include one or more server banks, computer banks, computing clusters, or other arrangements.

The application service 109 can receive an indication of the client device's 106 activity status from the management service 118. In some examples, the client device's 106 activity status can be transmitted directly to the application service 109 by the management service 118. In other examples, the client device's 106 activity status can be exposed to the application service 109 using an API. For instance, the application service 109 can call an API provided by the management service 118 to obtain the client device's 106 activity status.

In some examples, the application service 109 can deliver or refrain from delivering a notification to the client device 106 based on the activity status of the client device 106. For example, the application service 109 can deliver a notification to the client device 106 if the client device's 106 activity status is active. As another example, the application service 109 can refrain from delivering a notification to the client device 106 is the client device's 106 activity status is inactive. In that case, the application service 109 can cache, delete, or otherwise retain the notification.

In other examples, the application service 109 can provide a notification with a notification payload that indicates, based on the activity status, whether the client device 106 should post the notification. The notification payload can comprise, for example, a notification identifier, a notification type, notification content, and a list of device identifiers. In some examples, the list of device identifiers can correspond to one or more client devices 106 that should post a notification. In other examples, however, the list of device identifiers can correspond to client devices 106 that should not post a notification. The application service 109 can modify the list to add or remove a device identifier associated with the client device 106. In some examples, however, the notification payload can include a list of application identifiers instead of or in addition to the list of device identifiers. The list of application identifiers can specify client application 124 that should post a notification, or client application 124 that should not post the notification.

Figure 2:
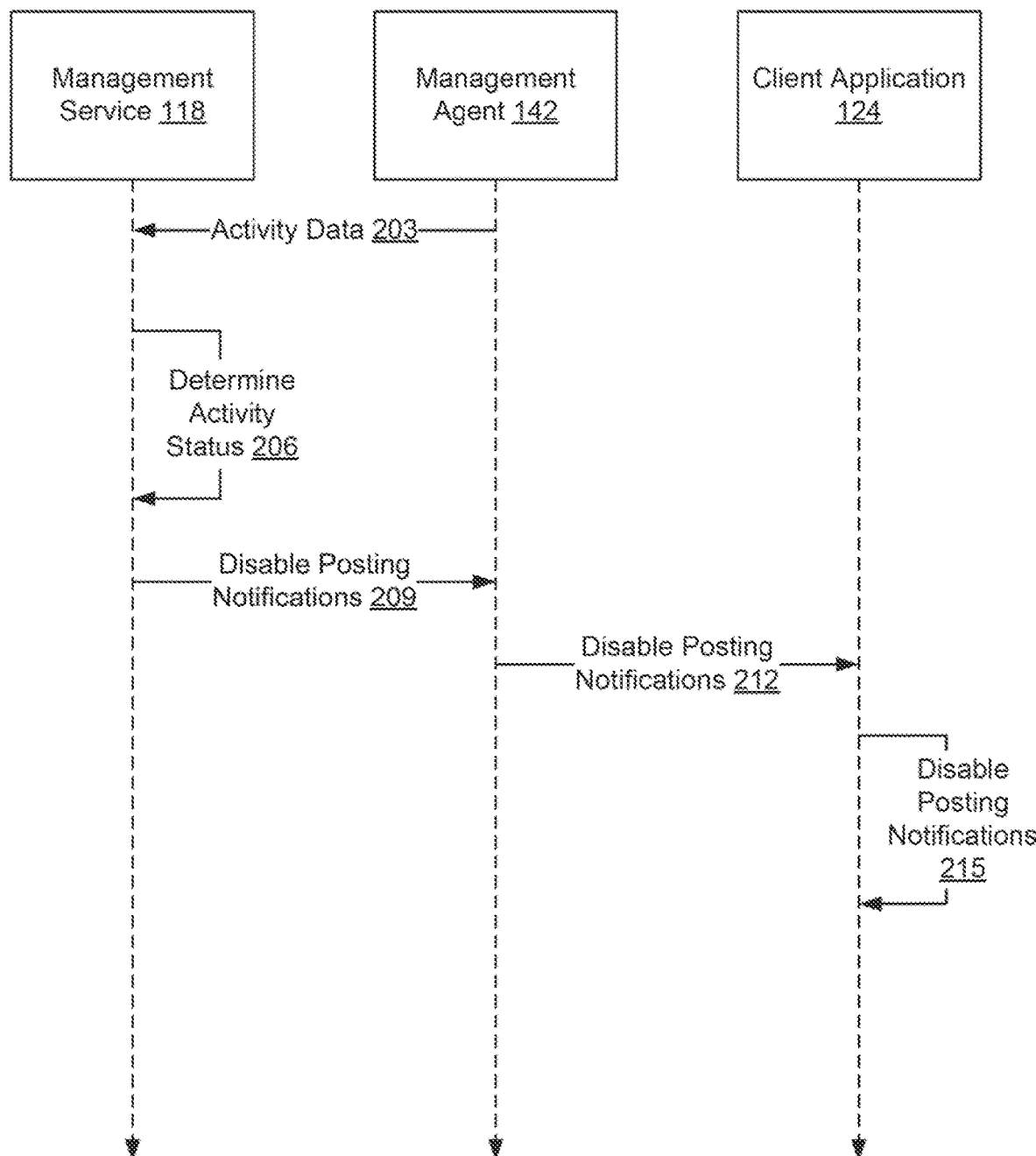
FIG. 2 shows a sequence diagram that provides one example of functionality implemented by components of the networked environment, according to various embodiments of the present disclosure.

FIG. 2 shows a sequence diagram that provides one example of functionality implemented by components of the networked environment 100. It is understood that the sequence diagram of FIG. 2 provides merely an example of the many different types of functional arrangements that can be employed to implement the portions of the networked environment 100 as described herein. As an alternative, the sequence diagram of FIG. 2 can be viewed as depicting an example of elements of a method implemented within the networked environment 100.

At step 203, the management agent 142 can provide activity data 139 to a management service 118. The activity data 139 can represent usage, settings, statuses, and other information indicative of activity on a client device 106. In some examples, the management agent 142 can provide the activity data 139 to the management service 118 periodically, in response to an event, or at any other suitable time. The activity data 139 can be collected from a client device 106 on which the management agent 142 is installed. In some examples, management agent 142 can collect activity data 139 from within a predefined time period.

At step 206, the management service 118 can determine that an activity status of the client device 106 is inactive based on the activity data 139. In some examples, the management service 118 can determine the activity status based on the activity data 139 indicating that the client device 106 has not been used within a predefined time period.

At step 209, the management service 118 can provide to the management agent 142 a command to disable a capability of the client application 124 to post notifications. The management service 118 can provide this command in response to the activity status of the client device 106 indicating that the client device 106 is inactive. For example, the management service 118 can place a command in a command queue maintained for an affected client device 106 for retrieval by the management agent 142. As another example, the management service 118 can provide the command directly to the management agent 142.

At step 212, the management agent 142 can transmit a command to disable posting notifications to the client application 124 via the interprocess communication channel 145. In some examples, command can specify for which applications the capability to post notifications is to be disabled. The management agent 142 can then provide the command to the client application 124 in response to determining that the command specifies the client application 124 as an application for which the capability to post notifications is to be disabled.

At step 215, the client application 124 can disable its capability to post notifications. For example, the client application 124 can disable a setting of the client application 124 that controls whether the client application 124 can post notifications. As another example, the client application 124 can modify an operating system permission to disable its capability to post notifications. The client application 124 can then refrain from posting notifications until the management agent 142 causes the client application 124 to enable the capability of the client application 124 to post notifications.

Figure 3:
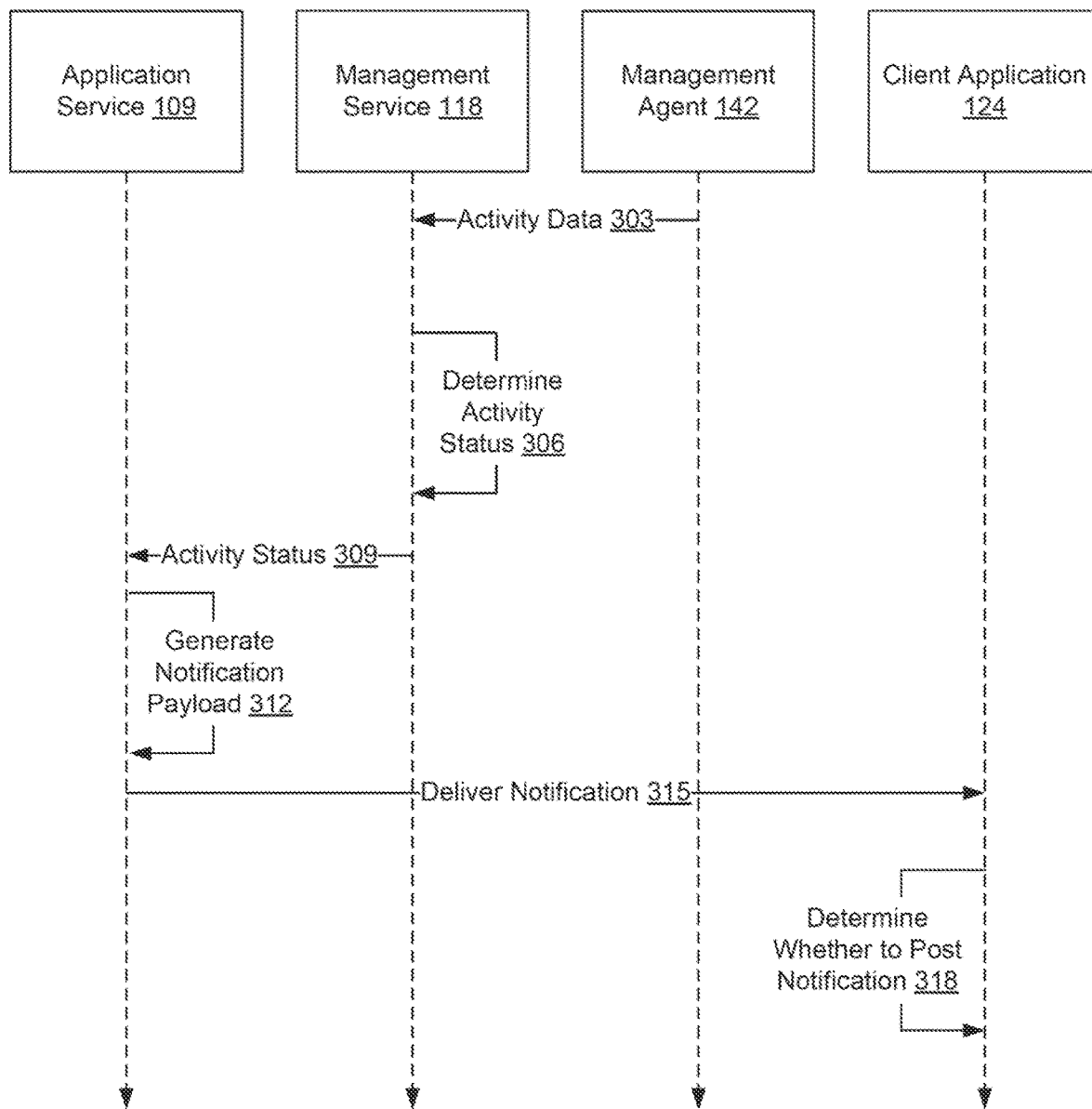
FIG. 3 shows a sequence diagram that provides one example of functionality implemented by components of the networked environment, according to various embodiments of the present disclosure.

FIG. 3 shows a sequence diagram that provides one example off functionality implemented by components of the networked environment 100. It is understood that the sequence diagram of FIG. 3 provides merely an example of the many different types of functional arrangements that can be employed to implement the portions of the networked environment 100 as described herein. As an alternative, the sequence diagram of FIG. 3 can be viewed as depicting an example of elements of a method implemented within the networked environment 100.

At step 303, the management agent 142 can provide activity data 139 to a management service 118. The activity data 139 can represent usage, settings, statuses, and other information indicative of activity on a client device 106. In some examples, the management agent 142 can provide the activity data 139 to the management service 118 periodically, in response to an event, or at any other suitable time. The activity data 139 can be collected from a client device 106 on which the management agent 142 is installed. In some examples, management agent 142 can collect activity data 139 from within a predefined time period.

At step 306, the management service 118 can determine that an activity status of the client device 106 is inactive based on the activity data 139. In some examples, the management service 118 can determine the activity status based on the activity data 139 indicating that the client device 106 has been used within a predefined time period.

At step 309, the management service 118 can provide to the application service 109 an indication that the client device 106 is inactive. The management service 118 can access the application data 136 to identify client application 124 installed on the client device 106 and determine the application service 109 associated with the client application 124. In some examples, the management service 118 can transmit the client device's 106 activity status or other indication that the client device 106 is inactive to the application service 109. In other examples, the management service 118 can expose the client device's 106 activity status or other indication that the client device 106 is inactive to the application service 109 using an API. For instance, the application service 109 can call an API provided by the management service 118 to obtain the client device's 106 activity status or other indication that the client device 106 is inactive.

At step 312, the application service 109 can provide to the client application 124 with a notification that includes a notification payload. The notification payload can comprise, for example, a notification identifier, a notification type, notification content, and a list of device identifiers. The list of device identifiers can correspond to client devices 106 that should post notifications received from the application service 109. In this case, the list of device identifiers may not include a device identifier corresponding to the client device 106 on which the client application 124 is installed.

At step 315, the client application 124 can check the notification payload of the notification to determine whether the client device 106 should post the notification. In some examples, the client application 124 can check the list of device identifiers included in the notification payload. For instance, if the device does not find its own device identifier on the list of device identifiers, the device can refrain from posting the notification. In some examples, however, the list of device identifiers can identify devices that should not post notifications. In that case, the device can refrain from posting the notification if it does find its own device identifier on the list of device identifiers.

Figure 4:
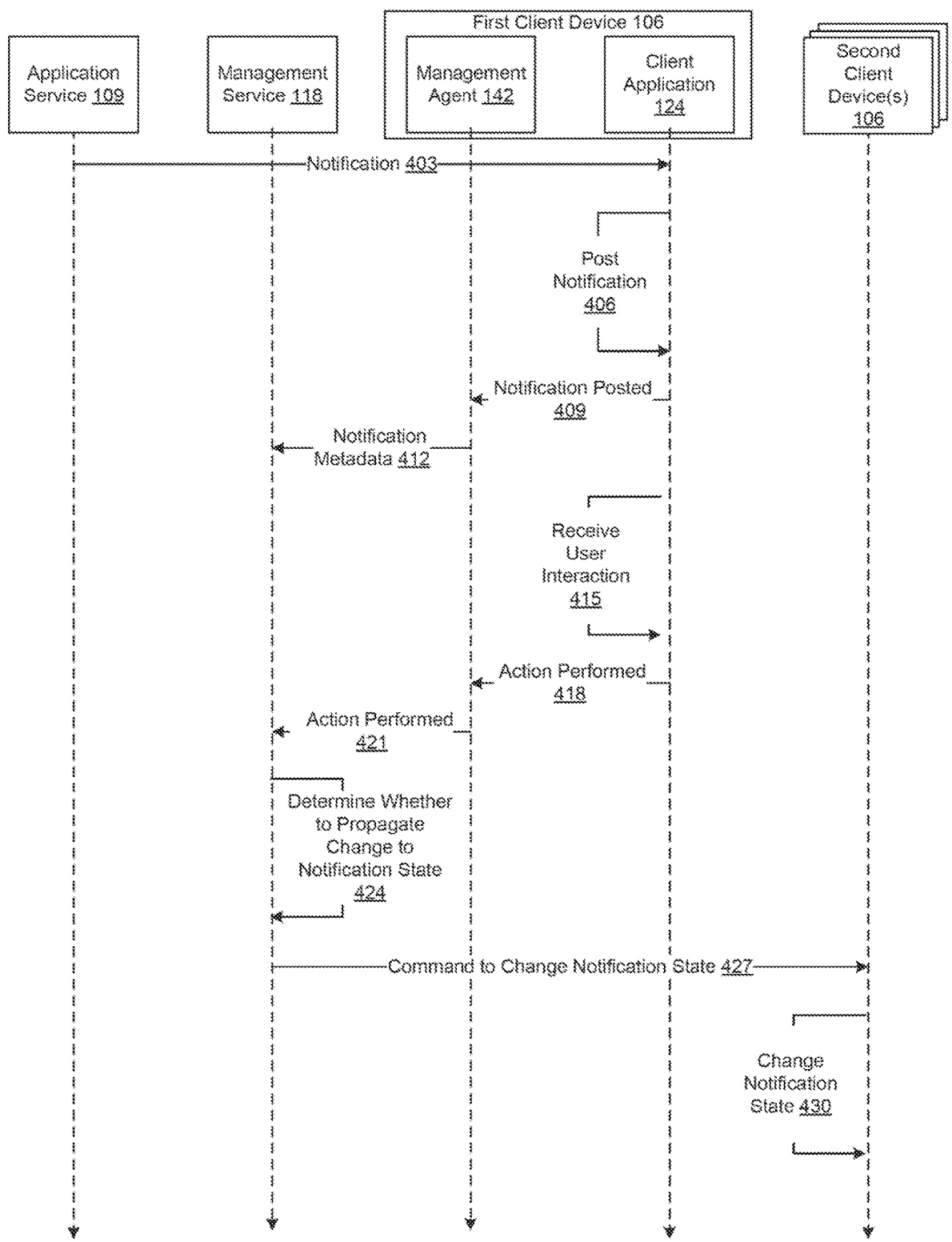
FIG. 4 shows a sequence diagram that provides one example of functionality implemented by components of the networked environment, according to various embodiments of the present disclosure.

FIG. 4 shows a sequence diagram that provides one example of functionality implemented by components of the networked environment 100. It is understood that the sequence diagram of FIG. 4 provides merely an example of the many different types of functional arrangements that can be employed to implement the portions of the networked environment 100 as described herein. As an alternative, the sequence diagram of FIG. 4 can be viewed as depicting an example of elements of a method implemented within the networked environment 100.

At step 403, a client application 124 installed on a first client device 106 can receive a notification from the application service 109. The notification can comprise a message or other indication to be displayed in a user interface of the client device 106. The notification can be, for example, a heads-up notification, a lock screen notification, a notification bar notification, an application badge notification, or a toast notification.

At step 406, the client application 124 can post the notification on the client device 106. The client application 124 can post the notification by, for example, invoking functionality provided by an operating system of the client device 106. Posting the notification can include pushing the notification or otherwise causing the notification to be displayed in a notification display area or elsewhere in a user interface of the client device 106.

At step 409, the client application 124 can provide a management agent 142 also installed on the first client device 106 with an indication that the notification has been posted on the client device 106. The client application 124 can further provide metadata associated with that notification to the management agent 142. The metadata can include, for example, a notification identifier, a notification type, notification content, one or more actions associated with a notification, and other data associated with a notification. The client application 124 can communicate with the management agent 142 via the interprocess communication channel 145.

At step 412, the management agent 142 can provide the metadata associated with the notification to the management service 118.

At step 415, the client application 124 can receive a user interaction with the notification on the client device 106. The user interaction can correspond to an action performable with respect to the notification.

At step 418, the client application 124 can provide the management agent 142 with an indication that an action has been performed with respect to the notification. The action can correspond to the user interaction received at step 415. The action can be, for example, a dismissal of the notification, a reply to a message delivered to the client application 124, a deletion of data associated with the client application 124, or any other action that effectuates functionality provided by the client application 124.

At step 424, the management agent 142 can provide the indication of the action performed with respect to the notification to the management service 118.

At step 427, the management service 118 can determine whether to propagate a new notification state to at least one second client device 106 associated with a same user account as the first client device 106. The management service 118 can make this determination based on, as one example, a notification type of the notification. As another example, the management service 118 can make this determination based on a current notification state of a notification on the second client device 106. As an additional example, the management service 118 can make this determination based on an activity status of the second client device 106.

At step 430, the management service can provide to the second client device 106 a command to change a state of the notification on the second client device 106. This command can instruct the second client device 106 to change a state of the notification from the current notification state to the new notification state. For example, the management service 118 can place a command in a command queue maintained for the second client device 106.

At step 433, the client application 124 can change the state of the notification from a current notification state to the new notification state. In some examples, the second client device 106 can change the state of the notification from the current notification state by causing an action to be performed that results in the notification taking on the new notification state.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

The sequence diagrams of FIGS. 2, 3, and 4 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the sequence diagrams of FIGS. 2, 3, and 4 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The computing environment 103, client device 106, application service 109, or other components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 118 and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

What is claimed is:

1. A system, comprising:
   a computing device comprising a processor and a memory;
   program instructions stored in the memory that, when executed by the processor, cause the computing device to at least:
   provide a first notification to a first client device, the first notification corresponding to an application installed on the first client device;
   obtain activity data associated with the first client device;
   provide to the first client device a command to disable a capability of the application to post notifications;
   receive an indication of an action performed with respect to a second notification on a second client device, the action corresponding to a change in a state of the second notification on the second client device; and
   determine to refrain from propagating the change in the state of the second notification to the first client device based at least in part on the activity data associated with the first client device, a state of the first notification on the first client device, and a type of the second notification.

2. The system of claim 1, wherein the command to disable the capability of the application to post notifications comprises a command to disable an operating system permission to post notifications.

3. The system of claim 1, wherein the program instructions, when executed by the processor, further cause the computing device to at least provide to the first client device a command to disable data synchronization for the application.

4. The system of claim 1, wherein the activity data comprises data from within a predefined time period that represents at least one of a user interaction with the first client device, a usage of one or more applications installed on the first client device, a lock status of the first client device, a power status of the first client device, a network connectivity status of the first client device, accelerometer data, and a usage pattern of the first client device.

5. The system of claim 1, wherein the activity data indicates that the first client device is inactive.

6. A method, comprising:
   providing a first notification to a first client device, the first notification corresponding to an application installed on the first client device;
   obtaining activity data associated with the first client device;
   providing to the first client device a command to disable a capability of the application to post notifications;

receiving an indication of an action performed with respect to a second notification on a second client device, the action corresponding to a change in a state of the second notification on the second client device; and determining to refrain from propagating the change in the state of the second notification to the first client device based at least in part on the activity data associated with the first client device, a state of the first notification on the first client device, and a type of the second notification.

7. The method of claim 6, further comprising providing a command to disable data synchronization for the application.

8. The method of claim 6, wherein the command to disable the capability of the application to comprises a command to disable an operating system permission to post notifications.

9. The method of claim 6, wherein the activity data comprises data from within a predefined time period that represents at least one of a user interaction with the first client device, a usage of one or more applications installed on the first client device, a lock status of the first client device, a power status of the first client device, a network connectivity status of the first client device, accelerometer data, and a usage pattern of the first client device.

10. The method of claim 6, wherein the activity data indicates that the first client device is inactive.

11. A non-transitory computer-readable medium comprising machine-readable instructions, wherein when executed by a processor of at least one computing device, the machine-readable instructions cause the at least one computing device to at least:

provide a first notification to first client device, the first notification corresponding to an application installed on the first client device;

obtain activity data associated with the first client device;

provide to the first client device a command to disable a capability of the application to post notifications;

receive an indication of an action performed with respect to a second notification on a second client device, the action corresponding to a change in a state of the second notification on the second client device; and determine to refrain from propagating the change in the state of the second notification to the first client device based at least in part on the activity data associated with the first client device, a state of the first notification on the first client device, and a type of the second notification.

12. The non-transitory computer-readable medium of claim 11, wherein the command to disable the capability of the application to post notifications comprises a command to disable an operating system permission to post notifications.

13. The non-transitory computer-readable medium of claim 11, wherein the machine-readable instructions, when executed, further cause the at least one computing device to at least provide to the first client device a command to disable data synchronization for the application.

14. The non-transitory computer-readable medium of claim 11, wherein the activity data comprises data from within a predefined time period that represents at least one of a user interaction with the first client device, a usage of one or more applications installed on the first client device, a lock status of the first client device, a power status of the first client device, a network connectivity status of the first client device, accelerometer data, and a usage pattern of the first client device.

15. The non-transitory computer-readable medium of claim 11, wherein the activity data indicates that the first client device is inactive.

* * * * *